Figure 1:
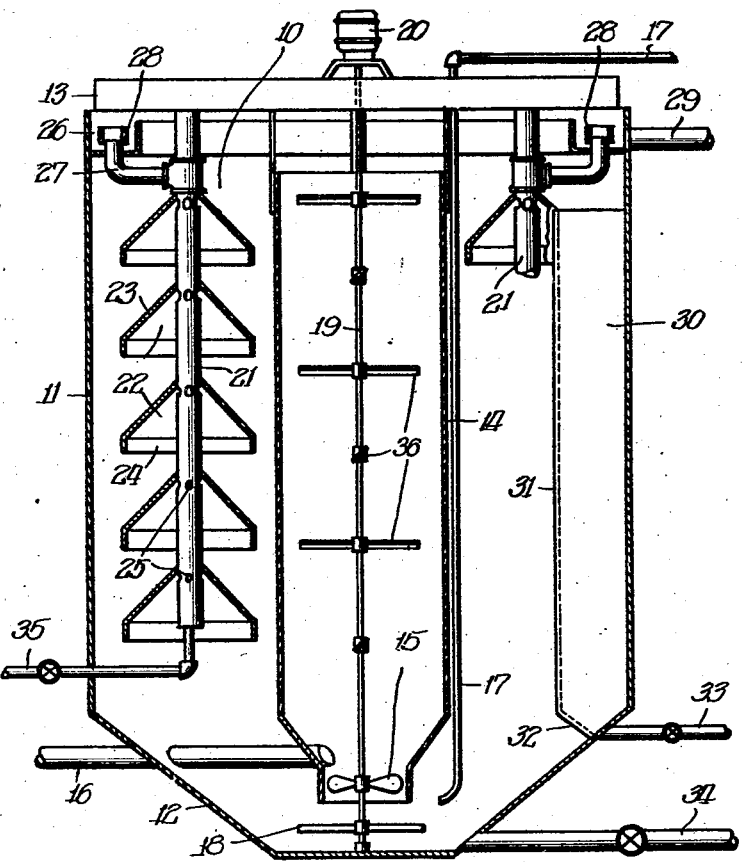

March 30, 1943.  W. H. GREEN  2,314,977
LIQUID PURIFICATION
Filed Aug. 8, 1940  2 Sheets-Sheet 1

INVENTOR.
Walter H. Green

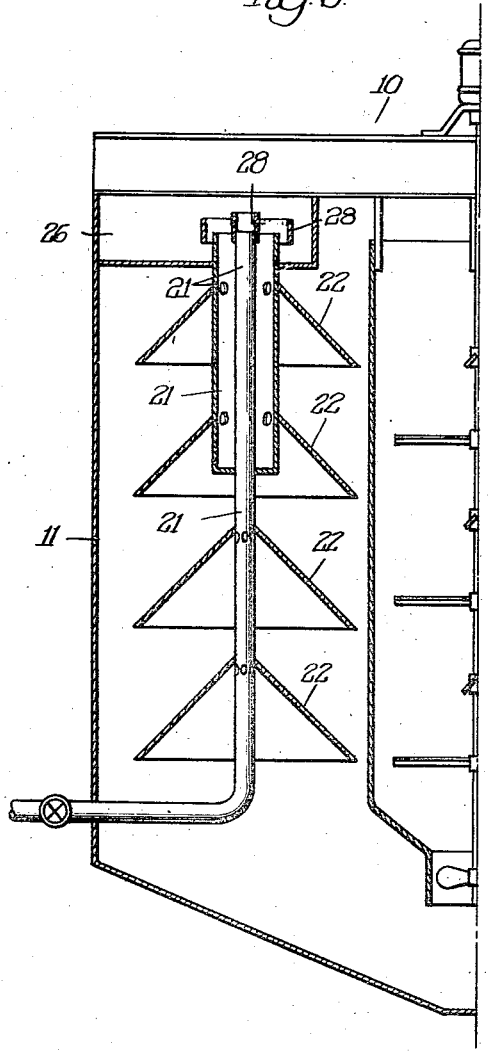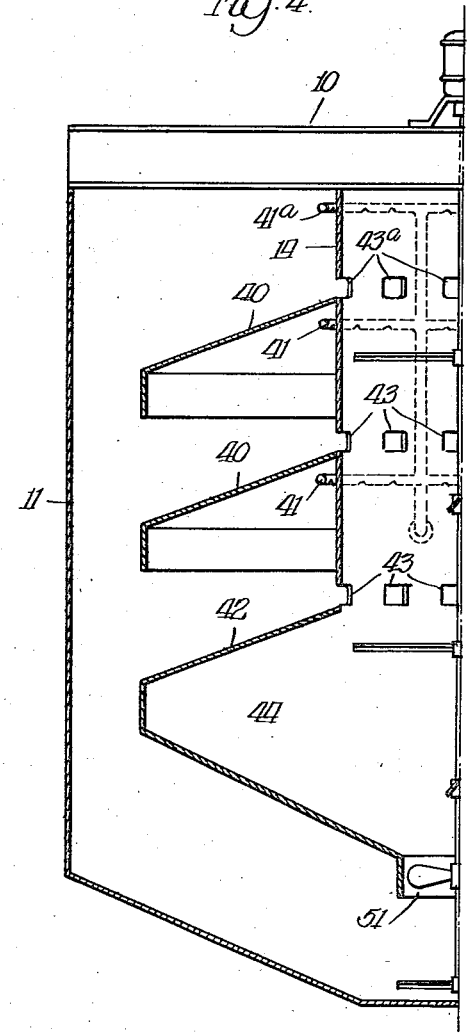

Patented Mar. 30, 1943

2,314,977

UNITED STATES PATENT OFFICE 2,314,977

LIQUID PURIFICATION

Walter H. Green, Chicago, Ill., assignor to Infilco Incorporated, a corporation of Delaware Application August 8, 1940, Serial No. 351,849

16 Claims. (Cl. 210—16)

This invention relates to method and apparatus for removal of impurities from water, sewage or the like by precipitation or coagulation and subsequent clarification. My method and my apparatus will be described as in softening hard water by the lime soda process as an example illustrating but not limiting the invention.

In the past in such a softening treatment of water, and it may be said in other treatment of aqueous liquids wherein clarification is involved, the practice has been to deliver the dosed and turbid water either at the bottom or at an end of a clarification basin and to effect clarification by settling of solid particles as the water flows upwardly or horizontally to a remote outlet. In either case the basin is partly filled with turbid water and partly with clear water, there being a more or less gradual transition from an initial high turbidity to a final clarity at different sections of the basin in the line of water flow. In any such clarification process a determinant of the rate of clarification or the volume of water clarified per unit of time is a function of the cross-sectional area of the basin. Manner of ingress of water to and of egress from the basin at some predetermined level therein, velocity of flow and retention time therein are also factors but in practice these must be related to the cross-sectional area.

In contradiction to all such processes where, as stated, there is a more or less gradual transition from an initial high to a final low turbidity in a line of flow across the basin, the basin being partly filled with turbid and partly with clear water, I propose to keep the basin during operation filled with highly turbid water and take off clear water in a manner to be referred to. Furthermore, whereas it has been the accepted practice and considered necessary to confine agitation to a limited space within such basins, or provide needed mixing outside, and to provide for a general quiescent flow with slow velocity in the major portion of the basin volume, I propose to maintain a high rate of flow extending beyond the zone of turbulence and throughout the whole volume of the basin, including what would ordinarily be used as the clarification zone, and to take off clear water from or through takeoff members that are submerged in the turbid flow within the basin. Furthermore, whereas it has been the practice to reserve the greater portion of the basin for sedimentation and to pass the water but once and slowly through this space so that it is turbid at the entrance and clarified at the exit thereof, I propose to maintain a general circulation of water undergoing treatment throughout the basin so that the whole volume thereof will repeatedly pass through each cross-section of the basin, and will so pass at a quite rapid flow. In fact, I want a rate of flow and general conditions throughout the basin such as to maintain a general high condition of turbidity.

I have in mind as one main object to obtain an increase of treating capacity in a basin of given volume, whereby certain economies are effected.

Another object is to shorten the necessary time of retention for completion of treatment, which in some cases, as where a liquid such as sewage may become septic, is important.

Another object is to reduce the required cross-sectional area of the basin, clear water separation area and necessary volume or retention time being obtained by depth rather than cross-section.

Another object is to provide clear water separation surfaces or areas that are submerged in a relatively rapidly moving body of water undergoing treatment.

Another object related to the preceding is to obtain a relatively large total clear water separation area by a plurality of vertically spaced submerged surfaces.

Related to the two just preceding objects is that of controlling the flow or delivery of clarified water from such submerged surfaces or areas.

Another object is the production of a slurry of nature adapted to the separation of clear water therefrom and its circulation and maintenance throughout the volume of the basin and still another object is the provision of an apparatus adapted to the carrying out of my improved process, such apparatus including the submerged members whereby or wherein water separation is effected as well as means adapted to secure the formation, the maintenance and the circulation of the slurry throughout the general volume of the basin.

Other objects will be mentioned during the following presentation and illustrations of my invention or will be apparent from consideration thereof.

Figure 2:
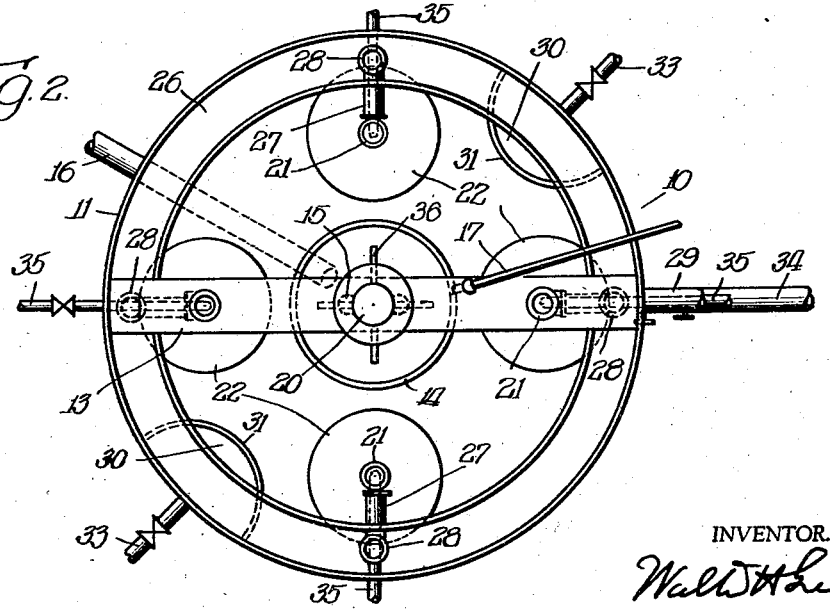

The invention will be readily understood by reference to the drawings wherein Fig. 1 is a diagrammatic sectional elevation of one embodiment of my new apparatus; Fig. 2 is a plan view of the apparatus shown in Fig. 1; Fig. 3 is a part elevation in section of a slight modification of the apparatus shown in Fig. 1; and Fig. 4 is a part elevation in section of another modification of the apparatus shown in Fig. 1.

Referring first to Figs. 1 and 2, the apparatus includes a tank 10 shown as having cylindrical side walls 11 and a bottom 12 formed as an inverted truncated cone, the tank being open at the top. I-beams 13 span the top of the tank and serve to suspend a central cylindrical open-ended tube 14, the top of the tube being submerged below the water level in tank 10 and the lower end of the tube being located somewhat above the tank bottom 12. The lower end of tube 14 is shown of restricted cross-section to accommodate the required size of propeller, the wall of the tube between the wide and the restricted sections thereof being inclined to prevent the retention of sediment thereon. A rotary liquid agitating and impelling or propelling member 15 is disposed in the lower part of the tube and additional liquid agitating and impelling members 36 are disposed in the upper part of the tube to provide and promote the upward flow of water in the tube 14, and to rapidly and thoroughly mix water entering the tube through an inlet pipe 16 with slurry drawn up through the lower end of tube 14 and with reagents received in the tank through a chemical feed pipe 17. The impelling and agitating members 15 and 36 as well as an agitating and sediment cutting blade 18 closely spaced above the tank bottom, are secured to a vertical shaft 19 depending from and driven by a motor reducer 20 which is supported by I-beams 13.

Clear water withdrawal pipes 21 extending downward from the top part toward the bottom part of tank 10 and closed at the bottom are suspended from the I-beams 13 at points horizontally spaced about half way between the periphery of tank 10 and that of tube 14, at uniform angular distances from one another. Four such pipes are shown in Fig. 2 but there could be more or fewer of them. Fig. 1 shows one such pipe complete, the lower part of the other pipe being broken away in order to more clearly reveal additional structure. Each pipe 21 serves a stack of superimposed clarification bells 22, said bells being shown supported by the respective pipes 21. Each bell 22 comprises a cone shaped top member 23 the apex of which is secured to its pipe 21. A cylindrical flange 24 depends from each cone 23. The several bells may be made of identical shape and size and may be uniformly spaced from one another along pipe 21. Adjacent and below the top of each bell where the bell is secured to pipe 21 the said pipe has holes 25 formed therein. The several pipes 21 communicate with a channel 26 disposed adjacent the top of tank 10, through conduits 27 passing through the bottom of channel 26 and having vertically adjustable sleeves 28 at the outlets thereof in said channel. An effluent header 29 is joined to the channel 26. Although the channel 26 is shown in the common form of an overflow launder the top edge thereof is above the normal operating liquid level in tank 10 and may be even with the top edge of the tank 10 so that water does not spill into it over its edge.

One or more slurry concentrators 30 having side walls 31 of half-cylindrical form are shown secured to tank wall 11, the side walls 31 terminating in horizontal top edges spaced below the normal operating liquid level in 10, and which together with tank wall 11 provide concentrator intakes of sufficient area. The lower end of each concentrator is closed by a bottom 32 joined to the tank bottom 12 and concentrator sidewall 31. A valved outlet pipe 33 leads from each concentrator bottom 32. The concentrators may be disposed intermediate adjoining stacks of clarification bells 22 as shown; or they may be modified so that they form a continuous ring or trough secured to the inside of tank wall 11 or to the outside of agitator tube 14; or various other modifications adapted to the intended purpose may be made.

Valved drain pipes 34 and 35 lead from the bottom of tank 10 and the bottom of clear water withdrawal pipe 21 respectively.

In operation, raw water enters through the inlet 16, is mixed in the mixing and reaction tube 14 with slurry drawn in by impeller 15, the slurry carrying reagent fed through pipe 17. The mixture escapes over the top of the mixing and reaction tube 14 and descends in the outer spaces between the walls of the tank 10 and the tube 14, and part of it is again drawn in by the impeller 15. In this way there is maintained a continuous circulation within the tank 10, and this circulation is of such magnitude or velocity as to maintain in suspension all or at least the major part of the solid products of reaction and also of any turbidity imparting particles carried in by the raw water. The size of the chamber 14 is preferably such that effective mixing and practical completion of the reaction involved is had before the water escapes from the mixing and reaction tube 14. These reactions are hastened in a well known manner by causing them to take place in the presence of solids from previous reactions and which accumulate in the water as will later become apparent. By carrying out the treatment in this way there is developed a slurry of such nature that clear water will readily and rapidly escape from it or be squeezed out if a surface for escape is provided.

In previous apparatus utilizing a circulation of a slurry of nature more or less similar to that I obtain, a surface for the escape of treated water from the slurry has been provided only at the upper level or face of the slurry and was, therefore, of an area corresponding to the free cross-sectional area of the basin at that level. I have found, however, that escape of clear water will just as well take place from a submerged surface such as may be had by submerging a bell in this circulating slurry, and that by utilizing such bells in combination with a proper circulation of slurry, a very large escape area for clear water may be had and utilized in a basin which is of relatively small cross-sectional area.

As the water undergoing treatment, which at this point can be considered as part of the slurry, returns from the top of the mixing and reaction tube 14 to the bottom of the tank 10, it passes down around the bells 22 and a portion of the water will rise in the bells and then pass through openings 25 and finally enter pipe 21. The turbulent mixing of water and reagent in and with slurry as above described will result in the formation of a relatively small number of very dense particles, which readily separate out of the water as it rises in the bells, 22, so that only clarified water will be withdrawn through the outlet openings, 25, into the pipe, 21. Through this pipe and conduit 27 it will flow into conduit 26. The rate at which it will rise under the bells 22 and into pipe 21 is a function of the size of openings 25 and the rate of flow up through the pipe 21 is dependent upon the level of the top of adjustable sleeve 28 with relation to the slurry level in the tank 10. By proportioning the area of openings 25 and by positioning of sleeve 28 control may be had of the rate of escape of water from each bell and from each group of bells. It is to be noted that as shown in Fig. 1, the openings 25 in the bells on the lower end of pipe 21 are smaller than those above. If the liquid under the bells and in pipe 21 were of the same specific gravity as the surrounding liquid this would not be necessary, but in operation the liquid in pipe 21 is clear water whereas the surrounding liquid is a slurry that may contain several percent of solids by weight, in practice up to or beyond 5%, and with a specific gravity substantially above that of clear water. With this difference of specific gravity and the varying depths of submergence of the different bells it is necessary to restrict the flow from the lower bells to a greater extent when they feed into a common riser and this variation in orifice size provides a means of control. Instead of such variable orifices each bell could have its separate take off pipe but this calls for a rather complicated system of piping and for a separate control, such as sleeve 28, on each such pipe. Instead of putting all the bells in one vertical series on a common riser pipe, there may be two or more riser pipes, and these may be concentric, as in Fig. 3. In this way a separate riser may be provided for each bell, or as in Fig. 3, two bells of but small difference in vertical elevation may feed into a common pipe thus reducing the total number of risers. Each riser, however, should have some control, such as a member 28 whereby the outflow therefrom may be controlled. Because of the greater height of the heavy liquid column effective on the inner pipe, the clear water will rise to a somewhat higher level in this than in the outer pipe, and consequently its control member 28 will be at a higher level than that of the outer pipe and control may be had with water from the inner tube flowing out and over the discharge from the outer tube. The discharge from channel 26 should, however, be such that the water level in channel 26 will always be below the discharge level from pipe or pipes 21, and when this is the case and there is an inner and an outer pipe 21, the sleeve 28 on the outer pipe may be slotted or perforated to allow a partial escape of the flow, and so provide a lower level of discharge than over its top edge. A different form of bell is shown in Fig. 3 but that shown in Fig. 1 is preferable. These bells may be regarded as enlargements of pipe 21 or as hoods protecting the outlet openings 25.

As the water carrying solids, commonly spoken of as the slurry in this form of treatment, descends around the bells 22 it flows under these bells and here there is a protected surface from which clear water can and does escape, it being understood that the flow from each bell is so restricted by the means provided that it does not exceed the rate of escape of clear water from the area provided thereby. The rate of clear water escape from such a submerged surface is so far as yet appears the same as from the usual open surface per unit of area, and this rate is frequently of the order of 3 gallons per square foot per minute or more and has been carried in cases up to or beyond double this amount.

This phenomenon of the rise of clear water out of a slurry such as is here obtained is not to be confused with ordinary sedimentation. Of course, the particles will settle if the water is allowed to come sufficiently to rest, but with a slurry conditioned as it becomes with this operation, clear water will escape from or at a surface below which the slurry is moving with considerable velocity. Also, clear water will escape through such a surface at a rate of rise that may be beyond the rate of fall of all of the solids present, so that a greater amount of clear water may be obtained per unit of horizontal area than will be had by ordinary sedimentation. In some cases clear water will rise through the slurry surface whereas if the same slurry is allowed to clarify by sedimentation a haze will be present in the water for some time.

The solids left behind by the escaping clear water remain in and descend with the remainder of the descending slurry, which becomes more concentrated in this way toward the bottom. At the bottom this thickened slurry is drawn again into mixing and reaction tube 14 by the propeller 16 and diluted by the entering raw water. The velocity of circulation maintained during operation is such as to prevent any substantial amount of solids from settling down and remaining on the floor, instead, because of the greater value to the process of unsedimented particles, they are kept in suspension. In an initial period of operation all solids are kept in the system and accumulate in the circulating water to form the gradually thickening slurry which is at the same time conditioned by the reactions that take place, the circulation, etc., until a slurry of the required nature is had. After this solids must be removed at a rate corresponding to the rate of accumulation. Such removal can be had in several ways. Solids will settle to the floor during periods of shut down and can then be discharged through drain pipe 34. In many cases operation is uninterrupted, and discharge of solids can then be had by withdrawing to waste an adequate proportion of the circulating slurry and this discharge may be through drain pipe 34. This, however, involves waste of water and a preferred discharge of solids, which avoids such waste, may be had by means of the slurry concentrator above described in connection with Figures 1 and 2.

Briefly, such slurry concentration or solids concentrating chambers comprise a chamber 30, closed at the bottom and having a valve controlled discharge pipe 33 leading from its lower portion. The top edge partition 31, which forms the inner wall of the chamber, terminates below the upper level of the circulating slurry in tank 10. With such an arrangement there will be above slurry concentrator 30 what may be spoken of as a protected area, from which solids will descend by settling into slurry concentrator 30, whence they may be discharged through waste pipe 33. The top area of slurry concentrator 30 is made in some correspondence with the quantity of solids to be removed. The quantity of solids that will settle into solids collecting chamber 30 is, of course, some function of the top area of the solids collecting chamber 30 and this area must be always sufficiently great. The cross-sectional area of such solids concentrator however may be greater than theoretically needed for the removal of solids, as the amount of solids actually removed from such chamber can be controlled by the discharge through the solids withdrawal pipe, 33. The depth or volume of solids concentrator 30 is made such as to provide for a period of retention of solids therein, and there will be a gradual thickening from top toward the bottom. In this way a quite thick sludge may be had at the bottom of concentrating chamber 30 and so solids will be discharged with small waste of water. Such discharge may be continuous or intermittent and may be manually or automatically controlled. In practice the usual control is from or according to the density of the circulating slurry. While there is in each case a permissible range of density, or solid content, of the circulating slurry within which good results may be had, this range will vary with different waters or treatments. In each case this permissible range is found in or as an initial stage of operation, in fact, it will ordinarily become apparent as operation proceeds. Thereafter, the discharge through outlet pipe 33 is adjusted to keep the density of the slurry within this range and usually about the middle thereof. The necessary area and volume of the solids concentrating chamber, 30, may be had by providing a plurality of small chambers, as shown in Figure 2.

During a period of shutdown, the solids will settle to the floor but when operation is resumed they will be quickly resuspended to reform the slurry, the blade 18 aiding in this resuspension. The bells 22 will normally be made to fill as well as may conveniently be, the entire available cross-sectional area of tank 10. These bells are shown round at the bottom but they may be of any desired cross-sectional shape, regular or irregular.

Perhaps it will be well to call attention to the point that not only is there a continual circulation of slurry down past the bells 22 but that there is a circulation between or under them. This may be induced to an extent by the general downward flow and it also comes from the inward flow to supply the water that escapes as clear water. In addition to these causes there is a downward flow, with resulting induced increased inward flow, from the increase in density of the slurry under the bells resulting from the escape of clear water. Such circulation is desirable for without it something approaching ordinary sedimentation conditions would exist under the bells and this, at least in some cases, would result in incomplete clarification, diminished output, or both. It is to be kept in mind that in this process the effect of gravity is unimportant for while the solids formed by the process above described are dense and readily settleable, they are carried in a stream of water which is moving downwardly faster than the force of gravity would pull them, so that clarification is not had by ordinary sedimentation but by the escape of clear water from a surface of moving slurry.

I am aware that in the past what is sometimes spoken of as sheltered sedimentation has been used. This term has been used to designate a process wherein water in passing from a mixing or agitating zone to the clarified water outlet is passed under what are known as protecting roofs. These roofs may be in the form of substantially horizontally extending tubes, usually slotted at the bottom to allow escape of solids settling from the passing water, or of inverted troughs across or through which the water passes. The basic idea and action of all these devices is to divide the water into a number of vertically spaced shallow streams, so that solids will have to move but a short vertical distance to reach and deposit on a slanting surface. These surfaces are usually so arranged that solids sliding from them will pass to the bottom of the tank without entering other streams of water undergoing clarification. It has been proposed to let such solids shower down through water undergoing treatment but which has not yet entered the clarifying members in order to get some washing out effect upon fine particles below. All such systems utilizing the "protecting roofs" are sedimentation systems wherein the solids are separated only as a result of gravity causing a downward movement thereof in the water undergoing clarification, and the clarification is progressive, the water becoming gradually clearer as it travels along its path, heavier particles dropping out first and lighter or smaller ones further on. In my process and apparatus the clear water literally escapes from the rapidly circulating slurry, the change from highly turbid slurry to clarified water being abrupt, occurring within a distance of a fraction of an inch. Furthermore, in each passage of a given volume of slurry through the annular space in which the bells, 22, are located only a portion is allowed to enter the bells, and only a part of the water in the slurry entering the bells is permitted to escape as clarified water, the escaping clear water leaving behind in the remaining slurry the solids it had contained, which solids are not permitted to deposit but are retained in the circulation. From one aspect it is this withdrawal or escape in clarified condition of but a portion of the total quantity of water present, the remainder continuing to circulate in highly turbid condition, that distinguishes my process most markedly from all forms of clarification by sedimentation.

In Fig. 4 there is shown another way in which the escape surface or area may be provided. In this figure the bells 40 are in the form of annular rings surrounding the central mixing and reaction chamber 14. The bottom of chamber 14 is shown enlarged to provide desired volume. In this Fig. 4, there is no discharge of the circulating slurry from the top of chamber 14. Instead, in this embodiment, the top of the mixing and reaction chamber 14 is extended to the plane approximately even with the top edge of tank 10 so as to be above the water line in tank 10. There is a separate discharge from mixing chamber 14 below each bell through openings 43 so as to provide a separate feed for and flow under each bell. This provision for a discharge under each bell allows for the carrying away of solids concentrating in the slurry under the superjacent bell without which some solids might deposit on the top of a subjacent bell. This also permits the top of the bells to be flatter and the bells wider and so provides for greater escape area in a given depth. Note that openings 43A are provided above the upper bell 40. These openings are to be at such a distance below the liquid level in tank 10 that an upper slurry level or surface will form in tank 10 below the upper water level therein thus providing clear water escape area over the whole area of tank 10 outside of the mixing and reaction chamber 14. Thus in the form shown in Fig. 4 there are three clear water escape areas, one under each bell 40 and one from the top area of the tank 10. Inasmuch as the space required between the outer edges of bells 40 and the wall 11 need be but small the areas under 40 will be nearly equal to that at the top, so providing in this case almost three times the escape area or clarifying rate otherwise had with a tank 10 of the same diameter. The clear water from under bells 40 is taken off through pipes 41, shown perforated, and that from the top of the tank 10 through a similarly perforated pipe 41A, these pipes leading to a common discharge header. It is to be understood that in general and except for the arrangement of the bells and related parts as described, the apparatus illustrated in Fig. 4 will be equipped and operated as above set forth in connection with Figs. 1 and 2.

It will be understood that the figures and description given are illustrative that my invention may be understood both as to process and as to required apparatus and are not to be taken as limiting in any respect. Obviously many modifications of apparatus may be made and the process carried out satisfactorily. It may be well to mention that upward flow in the mixing and reaction chamber 14 and downward flow around it are preferred, but good results may be had with reversed direction of flow.

I claim:

1. A water treating apparatus comprising in combination, a basin, a reaction chamber associated with said basin, said reaction chamber having an inlet positioned to receive water from one portion of said basin and an outlet positioned to deliver water to another and relatively remote portion of said basin, means within said reaction chamber and including a mechanically driven rotatable stream projecting impeller to cause a circulation of liquid through the reaction chamber from its inlet to its outlet and through the basin from said outlet to said inlet of a volume and velocity sufficient to prevent sedimentation of solids out of the liquid in said circulation, means for delivering raw water and treating reagent within the basin and adjacent to the inlet of the reaction chamber, a plurality of treated water outlet bells located within said basin below the normal operating liquid level therein and in the path of said circulation, inlet mouths into said bells at the lower ends thereof, liquid outlet openings from the upper part of said bells, conduits leading from said outlet openings to an outlet from said basin, and a waste discharge from said basin.

2. The apparatus of claim 1 wherein one opening of said reaction chamber is adjacent the floor of said basin and the other opening adjacent the normal operating surface level of water within said basin.

3. The apparatus of claim 1 wherein the reaction chamber is centrally located in said basin and the said bells are spaced annularly around said reaction chamber.

4. The apparatus of claim 1 wherein said bells are supported within said basin in position to permit withdrawal of water therefrom at different elevations.

5. The apparatus of claim 1 comprising means for controlling the rate of water flow from said bells.

6. The apparatus of claim 1 comprising means for withdrawing treated water from adjacent the operating surface level of water in said basin.

7. The apparatus of claim 1 wherein said reaction chamber has a plurality of outlets located at different levels.

8. The apparatus of claim 1 wherein the means for delivering the raw water and the treating reagent discharge at points separated from one another.

9. Water treating apparatus comprising in combination a treating basin, a raw water inlet to said basin, an outlet for treated water from said basin, means to deliver treating reagent to the water to be treated, a solids discharge from said basin, a mechanically driven stream projecting means of such size and nature and so placed in said basin relative to the water content thereof as to maintain substantially all of said content in continuous general circulatory movement of sufficient intensity to prevent sedimentation of solids out of said circulating liquid, power means connected to said stream projecting means to rotate the same, protecting members located within said basin in position to be within said general circulatory movement and so constructed and arranged as to provide quiescent spaces within said circulatory movement and an inlet opening into the bottom of the spaces defined by said members, outlet openings located to be shielded from said circulatory movement by said protecting members and to receive water from said circulatory movement through the spaces defined by said members, and conduits leading from said outlet openings to said treated water outlet.

10. In a water treating process wherein water undergoing treatment is mixed and reacted with a reagent in a body of slurry formed of water undergoing treatment and particles from previously treated water, the steps of maintaining the entire body of water undergoing treatment as a slurry by a degree of agitation and circulation sufficient to prevent any substantial deposit of solids therefrom, causing the circulating slurry to pass by a series of outlets protected from direct contact with the circulating slurry by substantially impervious deflecting walls surrounding said outlets and extending downwardly and outwardly therefrom, and withdrawing clarified water through said outlets at a rate corresponding to the rate of entry of water to the slurry.

11. In a water treating process wherein the water is dosed with a precipitate forming reagent, the steps of accumulating and retaining within a body of water undergoing treatment a substantial quantity of solids from previously treated water to form therewith a slurry extending substantially throughout said body of water, maintaining said slurry in suspension by agitation and circulation thereof, withdrawing clarified water from points within the said body of circulating slurry and protected from direct contact with the circulating slurry by substantially impervious deflecting walls surrounding said points and extending downwardly and outwardly therefrom, and withdrawing solids to waste from another point within said body of circulating slurry.

12. The method of claim 11 that comprises the additional step of concentrating the withdrawn solids prior to their discharge to waste by passing the slurry containing such solids into a quescent subsidence space, separating water and solids in such space and discharging the solids from such space.

13. In the treating of water by a process which includes treating the water with a reagent and separating impurities in solid form, the steps which comprise maintaining the water undergoing treatment as a pool of slurry containing particles separated and accumulated from previously treated water, circulating the slurry through a path embracing the major portion of said pool, mixing together in and with said circulating slurry in one portion of said path the entering raw water and a precipitant, withdrawing clarified water from a plurality of points within said circulating slurry at another portion in said path, said points being protected from direct contact with the circulating slurry by substantially impervious deflecting walls surrounding said points and extending downwardly and outwardly therefrom, and withdrawing solids to waste from still another point within said path.

14. A water treating process which comprises maintaining the water undergoing treatment as a body of slurry containing a substantial quantity of solids accumulated from previously treated water, continuously circulating the entire body of slurry in and through a closed path, entering and mixing the raw water and reagent with the circulating slurry in one sector of said path, providing in the circulating slurry as it passes through another sector of said path, a plurality of downwardly opening quiescent zones, withdrawing circulating slurry into said quiescent zones, withdrawing clarified water from the upper portion of said quiescent zones and withdrawing solids to waste from said slurry.

15. In the process for removing substances from water by the formation of a precipitate and clarification of the water from said precipitate, the steps which comprise maintaining a pool of slurry composed of water containing suspended particles separated and collected from a relatively large body of previously treated water; circulating substantially the entire volume of said slurry in a path leading upwardly through a confined reaction zone within said body of slurry and downwardly outside said confined zone; applying substantial mechanical propelling energy to the said slurry within said reaction zone to produce turbulence in said reaction zone, to effect said circulation of slurry, and to maintain the particles in the circulating slurry in suspension; separately passing water to be treated and a precipitation compound into said reaction zone and mixing them therein with not less than approximately twice their volume of slurry; removing slurry particles from said slurry to control the density thereof; displacing clarified water out of said circulating slurry at points within said circulating slurry and protected from direct contact with said circulating slurry by substantially impervious deflecting walls surrounding said points and having openings at the bottom; and withdrawing said displaced clarified water.

16. The process of claim 15 wherein clarified water is also withdrawn from a level above the circulating slurry.

WALTER H. GREEN.

CERTIFICATE OF CORRECTION.

Patent No. 2,314,977.   March 30, 1943.

WALTER H. GREEN.

It is hereby certified that error appears in the printed specification of the above numbered patent requiring correction as follows: Page 3, second column, line 6, for "all" read --fall--; line 46, for "concentration" read --concentrators--; line 50, after the word "edge" insert --of--; page 5, second column, line 57, for "quescent" read --quiescent--; page 6, second column, line 22, for "claim 15" read --claim 14--; and that the said Letters Patent should be read with this correction therein that the same may conform to the record of the case in the Patent Office.

Signed and sealed this 1st day of June, A. D. 1943.

(Seal)

Henry Van Arsdale,
Acting Commissioner of Patents.